(12) United States Patent
Dweck et al.

(10) Patent No.: US 10,218,837 B1
(45) Date of Patent: Feb. 26, 2019

(54) SYSTEMS AND METHODS FOR PREVENTING CONCURRENT DRIVING AND USE OF A MOBILE PHONE

(71) Applicants: Benjamin J. Michael Dweck, Jerusalem (IL); Jack Dweck, Aventura, FL (US)

(72) Inventors: Benjamin J. Michael Dweck, Jerusalem (IL); Jack Dweck, Aventura, FL (US)

(73) Assignee: Benjamin J. Michael Dweck, Jerusalem (IL)

( * ) Notice: Subject to any disclaimer, the term of this patent is extended or adjusted under 35 U.S.C. 154(b) by 0 days.

(21) Appl. No.: 15/897,341

(22) Filed: Feb. 15, 2018

Related U.S. Application Data

(60) Provisional application No. 62/629,219, filed on Feb. 12, 2018.

(51) Int. Cl.
*H04W 24/02* (2009.01)
*H04M 1/725* (2006.01)

(52) U.S. Cl.
CPC .... *H04M 1/72577* (2013.01); *H04M 1/72569* (2013.01); *H04M 1/72575* (2013.01); *H04M 2250/12* (2013.01)

(58) Field of Classification Search
CPC ......... H04M 1/72577; H04M 1/72575; H04M 1/72569; H04M 2250/12
See application file for complete search history.

(56) References Cited

U.S. PATENT DOCUMENTS

2013/0084847 A1*  4/2013  Tibbitts ................ H04W 8/245
                                                                455/419
2013/0344859 A1* 12/2013  Abramson ........ H04M 1/72577
                                                                455/418

* cited by examiner

*Primary Examiner* — Chuong A Ngo
(74) *Attorney, Agent, or Firm* — Marc Van Dyke; Fourth Dimension IP (57) ABSTRACT

Systems and methods for preventing a driver from driving concurrently with using a mobile phone, by disabling functionalities of the mobile phone or by disabling the driver's ability to drive, when the possibility of such concurrent use is detected.

17 Claims, 7 Drawing Sheets

SYSTEMS AND METHODS FOR PREVENTING CONCURRENT DRIVING AND USE OF A MOBILE PHONE

FIELD AND BACKGROUND OF THE INVENTION

The present invention relates to systems and methods for enhancing the safety of drivers and passengers while driving, and more specifically to systems and methods for preventing concurrent driving and use of a mobile phone by a driver.

Mobile phones are used by most people as a means for communication, and function as miniature computing devices enabling users to type, send emails, and use various applications. It is well know that use of mobile phones by a driver while driving causes the driver to be distracted, and that many car accidents occur while drivers are pre-occupied by their phones. As a result, in many countries in the world, use of mobile phones by drivers, while driving, has been forbidden by law. However, since mobile phones are so prevalent in modern lives, and provide so many functions, many drivers continue to use their mobile phones while driving, despite the legal prohibition.

There is thus a need in the art for a system and method which will prevent drivers from using their mobile phones, or at least some functions of their mobile phones, while driving, whether by disabling the phone when the vehicle is on or is in motion, or by disabling the vehicle when a mobile phone is in use.

SUMMARY

The present invention provides systems and methods for enhancing driving safety, and more specifically it provides systems and methods for preventing drivers from concurrently driving and using mobile phones. Such prevention may be accomplished by disabling driving (such as disabling starting of the engine or disabling acceleration) when a mobile phone is present or is being used, as shown in the first embodiment herein, as well as by disabling the driver's mobile phone when the vehicle is started or in motion, as shown in the second embodiment herein.

As such, according to a first embodiment of the present invention, there is provided a system including:
a. a motor vehicle having at least a driver-seat within a driver-seat sector,
b. a user control disposed in the driver-seat sector such that engagement of the user control starts or accelerates the motor vehicle;
c. first detection circuitry for detecting at least one of whether the motor vehicle is in motion and whether a motor of the motor vehicle is running;
d. second detection circuitry for detecting at least if a mobile phone is present in the driver-seat sector; and
e. phone disabling circuitry for disabling at least some functionality of the mobile phone, the phone disabling circuitry receiving a first input from the first detection circuitry and a second input from the second detection circuitry, wherein, if the first input indicates that the motor-vehicle is in motion, and the second input indicates a presence of a mobile phone in the driver-seat sector, the phone-disabling circuitry disables the at least some functionality of the mobile phone.

In some embodiments, the first detection circuitry is further for detecting if a motor of the motor vehicle is running, and wherein the phone disabling circuitry disables the at least some functionality of the mobile phone if the first input indicates that the motor of the vehicle is running and the second input indicates a presence of the mobile phone in the driver seat sector.

In some embodiments, the at least some functionality includes any functionality requiring a user of the mobile phone to type, take photos, or watch a video. In some embodiments, the at least some functionality does not include any voice activated functionality, hands-free functionality, or navigation functionalities. In some embodiments, the phone disabling circuitry is adapted to disable all functionality of the mobile phone if the first input indicates that the motor-vehicle is in motion, and the second input indicates a presence of a mobile phone in the driver-seat sector.

In some embodiments, the phone disabling circuitry is adapted to disable the at least some functionality of the mobile phone if the first input indicates that the motor of the motor-vehicle is running, and the second input indicates a presence of a mobile phone in the driver-seat sector, even if the motor-vehicle is not in motion.

In some embodiments, the second detection circuitry includes at least one of:
a mechanical sensor adapted to mechanically engage with the mobile-phone;
at least one image capturing device;
at least one proximity sensor,
at least one radio frequency proximity detector or WiFi transceiver; and
at least one RFID tag reader.

In some embodiments, the second detection circuitry includes a mechanical sensor adapted to mechanically engage with the mobile-phone, and wherein the phone disabling circuitry is adapted to disable fewer functionalities of the mobile phone if the second input indicates a mechanical engagement of the mobile-phone to the mechanical sensor than if the second input indicates that there is no mechanical engagement between the mobile phone and the mechanical sensor.

In some embodiments, the mechanical sensor includes a cradle adapted to receive the mobile phone therein.

In some embodiments, said vehicle includes at least one passenger seat disposed in at least one passenger sector. In some such embodiments, at least one of said at least one passenger seat is a driver-adjacent seat, and a sector of said at least one passenger sector including said driver adjacent seat is a driver adjacent sector.

According to the first embodiments of the present invention, there is provided a method for preventing use of a mobile phone during driving, to be carried out in a motor vehicle having at least a driver-seat within a driver-seat sector, the method including:
a. receiving a first input indicating whether the motor-vehicle is in motion;
b. receiving a second input indicating whether a mobile phone is present in the driver-seat sector of the motor vehicle; and
c. if the first input indicates that the motor-vehicle is in motion, and the second input indicates a presence of a mobile phone in the driver-seat sector, disabling at least some functionality of the mobile phone present in the driver-seat sector.

In some embodiments, the method further includes:
d. receiving a third input indicating whether a motor of the motor-vehicle is running; and e. if the third input indicates that the motor is running, and the second input indicates a presence of a mobile phone in the driver-seat sector, disabling at least some functionality of the mobile phone present in the driver-seat sector.

In some embodiments, (e) takes place even if the first input indicates that the motor vehicle is not in motion.

In some embodiments, disabling at least some functionality includes disabling any functionality requiring a user of the mobile phone to type, take photos, or watch a video. In some embodiments, disabling at least some functionality does not include disabling any voice activated functionality, hands-free functionality, or navigation functionalities. In some embodiments, disabling at least some functionality includes disabling all functionality of the mobile phone in the driver seat sector.

In some embodiments, receiving a second input indicating whether a mobile phone is present in the driver-seat sector of the motor vehicle includes receiving the second input indicating whether the mobile phone is mechanically engaged with a mechanical sensor, and wherein the disabling at least some functionality includes disabling fewer functionalities of the mobile phone if the second input indicates a mechanical engagement of the mobile-phone to the mechanical sensor than if the second input indicates that there is no mechanical engagement between the mobile phone and the mechanical sensor.

According to a second embodiment of the present invention, there is provided a system including:

a. a motor vehicle having seats within a cabin defining at least two sectors, one of the sectors being a driver-seat sector, and the remaining sectors being passenger seat sectors and including one driver-adjacent-sector;

b. a user control disposed in the driver-seat sector such that engagement of the user control starts or accelerates the motor vehicle;

c. first detection circuitry for detecting at least if a mobile phone is present in at least one of the driver-seat sector, the driver adjacent sector, and an intervening region between the driver-seat sector and the driver-adjacent sector, and d. motor-vehicle disabling circuitry for disabling or degrading the ability of the user control to trigger starting of the motor vehicle or affecting acceleration thereof, the motor-vehicle disabling circuitry receiving a first input from the first detection circuitry, wherein, if the first input indicates a presence of a mobile phone in at least one of the driver-seat sector, the driver adjacent sector, and the intervening region, the motor-vehicle disabling circuitry disables or degrades the ability of the user control to trigger starting of the motor vehicle or affecting acceleration thereof.

In some embodiments, prior to disabling or degrading the ability of the user control to trigger starting of the motor vehicle or affecting acceleration thereof, the motor-vehicle disabling circuitry notifies a user of the vehicle that, in a pre-determined time period, the motor vehicle will be disabled.

In some embodiments, the system further includes:

e. a phone-cradle mounted in the driver-seat sector or in the driver-adjacent sector or in the intervening region; and f. second detection circuitry functionally associated with the phone-cradle for detecting if the phone-cradle is occupied by the mobile phone, the motor-vehicle disabling circuitry receiving a second input from the second detection circuitry, and disabling or degrading the ability of the user control to trigger starting of the motor vehicle or affecting acceleration thereof if the first input indicates a presence of a mobile phone in at least one of the driver-seat sector, the driver adjacent sector, and an intervening region and the second input indicates that the phone-cradle is empty.

In some embodiments, the motor-vehicle disabling circuitry enables the ability of the user control to start the motor vehicle or affect acceleration thereof if the second user input indicates that the mobile-phone is placed in the cradle.

In some embodiments, the system further includes application disabling circuitry functionally associated with at least one of the first and second detection circuitry, for disabling at least some functionalities of the mobile-phone if the second detection circuitry indicates that the mobile-phone is disposed in the cradle. In some embodiments, the at least some functionalities include at least one of texting, web-surfing, reading documents, watching videos, reading and writing emails, conducting video calls, and using a camera.

In some embodiments, the application disabling circuitry enables use of at least some other functionalities of the mobile-phone if the second detection circuitry indicates that the mobile-phone is disposed in the cradle. In some embodiments, the at least some other functionalities include at least one of voice controlled dialing, voice controlled communication, dictating of text, navigation functionalities, and hand-free functionalities.

In some embodiments, at least one of the first detection circuitry and the second detection circuitry includes at least one of:
  at least one image capturing device;
  at least one proximity sensor;
  at least one radio frequency proximity detector or WiFi transceiver, and
  at least one RFID tag reader.

In some embodiments, the system further includes a warning providing module, adapted to provide a warning to at least one of the user and a remote entity if the mobile-phone is removed from the cradle while the motor-vehicle is started or moving.

In some embodiments, the motor-vehicle disabling circuitry disables or degrades the ability of the user control to trigger starting of the motor vehicle or affecting acceleration thereof only if the first input indicates a presence of a mobile phone in the driver-seat sector.

In some embodiments, the first detection circuitry includes a phone-recognition module adapted to identify a specific phone, and wherein the motor-vehicle disabling circuitry disables or degrades the ability of the user control to trigger starting of the motor vehicle or affecting acceleration thereof only if the first input indicates a presence of the specific mobile phone in at least one of the driver-seat sector, the driver adjacent sector, and the intervening region. In some embodiments, the specific mobile phone is a mobile phone belonging to at least one owner or to at least one frequent driver of the motor-vehicle.

According to the second embodiment of the present invention, there is provided a method for preventing disabling use of a mobile phone during driving, to be carried out in a motor vehicle having seats within a cabin defining at least two sectors, one of the sectors being a driver-seat sector, and the remaining sectors being passenger seat sectors and including one driver-adjacent-sector, the motor vehicle further including a user control disposed in the driver-seat sector such that engagement of the user control starts or accelerates the motor vehicle. the method including:

a. receiving a first input indicating a presence of a mobile phone in at least one of the driver-seat sector, the driver adjacent sector, and the intervening region; and b. if the first input indicates a presence of a mobile phone in at least one of the driver-seat sector, the driver adjacent sector, and the intervening region, disabling or degrading the ability of the user control to trigger starting of the motor vehicle or affecting acceleration thereof.

In some embodiments, the method further includes, prior to the disabling or degrading the ability of the user control to trigger starting of the motor vehicle or affecting acceleration thereof, notifying a user of the motor vehicle that, in a pre-determined time period, the motor vehicle will be disabled.

In some embodiments, the method further includes:

receiving a second input indicating whether a phone cradle mounted in the driver-seat sector, in the driver-adjacent sector, or in the intervening region is empty, and wherein the disabling or degrading is carried out only if the first input indicates the presence of the mobile phone and the second input indicates that the phone-cradle is empty.

In some embodiments, the method further includes, if the second input indicates that the mobile phone is disposed within the phone cradle, enabling the ability of the user control to start the motor vehicle or affect acceleration thereof.

In some embodiments, the method further includes disabling at least some functionalities of the mobile-phone if the second input indicates that the mobile-phone is disposed in the cradle. In some embodiments, disabling at least some functionalities includes disabling at least one of texting, web-surfing, reading documents, watching videos, reading and writing emails, conducting video calls, and using a camera.

In some embodiments, the method further includes enabling at least some other functionalities of the mobile-phone if the second input indicates that the mobile-phone is disposed in the cradle. In some embodiments, enabling at least some other functionalities include enabling at least one of voice controlled dialing, voice controlled communication, dictating of text, navigation functionalities, and hand-free functionalities.

In some embodiments, the method further includes providing a warning to at least one of the user and a remote entity if the mobile-phone is removed from the cradle while the motor-vehicle is started or moving.

In some embodiments, disabling or degrading occurs only if the first input indicates a presence of a mobile phone in the driver-seat sector.

In some embodiments, the method further including identifying a specific mobile phone, and wherein the disabling or degrading is carried out only if the first input indicates a presence of the specific mobile phone in at least one of the driver-seat sector, the driver adjacent sector, and the intervening region. In some embodiments, the specific mobile phone is a mobile phone belonging to at least one owner or to at least one frequent driver of the motor-vehicle.

According to another aspect of the second embodiment of the present invention, there is provided a system including:

a. a motor vehicle having at least a driver seat within a driver seat sector, b. a user control disposed in the driver-seat sector such that engagement of the user control starts or accelerates the motor vehicle;

c. first detection circuitry for detecting at least if a mobile phone is present in the driver-seat sector, and d. motor-vehicle disabling circuitry for disabling or degrading the ability of the user control to trigger starting of the motor vehicle or affecting acceleration thereof, the motor-vehicle disabling circuitry receiving a first input from the first detection circuitry, wherein, if the first input indicates a presence of a mobile phone in the driver-seat sector, the motor-vehicle disabling circuitry disables or degrades the ability of the user control to trigger starting of the motor vehicle or affecting acceleration thereof.

In some embodiments, prior to disabling or degrading the ability of the user control to trigger starting of the motor vehicle or affecting acceleration thereof, the motor-vehicle disabling circuitry notifies a user of the vehicle that, in a pre-determined time period, the motor vehicle will be disabled.

In some embodiments, the system further includes e. a phone-cradle mounted in the driver-seat sector; and f. second detection circuitry functionally associated with the phone-cradle for detecting if the phone-cradle is occupied by the mobile phone, the motor-vehicle disabling circuitry receiving a second input from the second detection circuitry, and disabling or degrading the ability of the user control to trigger starting of the motor vehicle or affecting acceleration thereof if the first input indicates a presence of a mobile phone in the driver-seat sector.

In some embodiments, the motor-vehicle disabling circuitry enables the ability of the user control to start the motor vehicle or affect acceleration thereof if the second user input indicates that the mobile-phone is placed in the cradle.

In some embodiments, the system further includes application disabling circuitry functionally associated with at least one of the first and second detection circuitry, for disabling at least some functionalities of the mobile-phone if the second detection circuitry indicates that the mobile-phone is disposed in the cradle. In some such embodiments, the at least some functionalities include at least one of texting, web-surfing, reading documents, watching videos, reading and writing emails, conducting video calls, and using a camera.

In some embodiments, the application disabling circuitry enables use of at least some other functionalities of the mobile-phone if the second detection circuitry indicates that the mobile-phone is disposed in the cradle. In some such embodiments, the at least some other functionalities include at least one of voice controlled dialing, voice controlled communication, dictating of text, navigation functionalities, and hand-free functionalities.

In some embodiments, at least one of the first detection circuitry and the second detection circuitry includes at least one of:

at least one image capturing device;

at least one proximity sensor;

at least one radio frequency proximity detector or WiFi transceiver; and at least one RFID tag reader.

In some embodiments, the system further includes a warning providing module, adapted to provide a warning to at least one of the user and a remote entity if the mobile-phone is removed from the cradle while the motor-vehicle is started or moving.

In some embodiments, the first detection circuitry includes a phone-recognition module adapted to identify a specific phone, and wherein the motor-vehicle disabling circuitry disables or degrades the ability of the user control to trigger starting of the motor vehicle or affecting acceleration thereof only if the first input indicates a presence of the specific mobile phone in the driver-seat sector. In some such embodiments, the specific mobile phone is a mobile phone belonging to at least one owner or to at least one frequent driver of the motor-vehicle.

According to another aspect of the second embodiment of the present invention, there is provided a method for preventing use of a mobile phone during driving, to be carried out in a motor vehicle having at least a driver-seat within a driver-seat sector, the motor vehicle further including a user control disposed in the driver-seat sector such that engagement of the user control starts or accelerates the motor vehicle, the method including:

a. receiving a first input indicating a presence of a mobile phone in the driver-seat sector; and
b. if the first input indicates a presence of a mobile phone in the driver-seat sector, disabling or degrading the ability of the user control to trigger starting of the motor vehicle or affecting acceleration thereof.

In some embodiments, the method further includes, prior to the disabling or degrading the ability of the user control to trigger starting of the motor vehicle or affecting acceleration thereof, notifying a user of the motor vehicle that, in a pre-determined time period, the motor vehicle will be disabled.

In some embodiments, the method further includes:
receiving a second input indicating whether a phone cradle mounted in the driver-seat sector, and
wherein the disabling or degrading is carried out only if the first input indicates the presence of the mobile phone and the second input indicates that the phone-cradle is empty.

In some embodiments, the method further includes, if the second input indicates that the mobile phone is disposed within the phone cradle, enabling the ability of the user control to start the motor vehicle or affect acceleration thereof.

In some embodiments, the method further includes disabling at least some functionalities of the mobile-phone if the second input indicates that the mobile-phone is disposed in the cradle. In some such embodiments, disabling at least some functionalities includes disabling at least one of texting, web-surfing, reading documents, watching videos, reading and writing emails, conducting video calls, and using a camera.

In some embodiments, the method further includes enabling at least some other functionalities of the mobile-phone if the second input indicates that the mobile-phone is disposed in the cradle. In some such embodiments, enabling at least some other functionalities include enabling at least one of voice controlled dialing, voice controlled communication, dictating of text, navigation functionalities, and hand-free functionalities.

In some embodiments, the method further includes providing a warning to at least one of the user and a remote entity if the mobile-phone is removed from the cradle while the motor-vehicle is started or moving.

In some embodiments, the method further includes identifying a specific mobile phone, and wherein the disabling or degrading is carried out only if the first input indicates a presence of the specific mobile phone in the driver-seat sector. In some embodiments, the specific mobile phone is a mobile phone belonging to at least one owner or to at least one frequent driver of the motor-vehicle.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

The present invention relates to systems and methods for enhancing the safety of drivers and passengers while driving, and more specifically to systems and methods for preventing concurrent driving and use of a mobile phone by a driver.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

In the context of the present application, the term "hands free functionality" relates to any functionality of a mobile phone that may be carried out without the user touching the mobile phone, such as a voice controlled functionality, a vision directed functionality, and any automatic functionality of the mobile phone such as providing driving instructions once the user has indicated the desired destination.

Figure 1A:
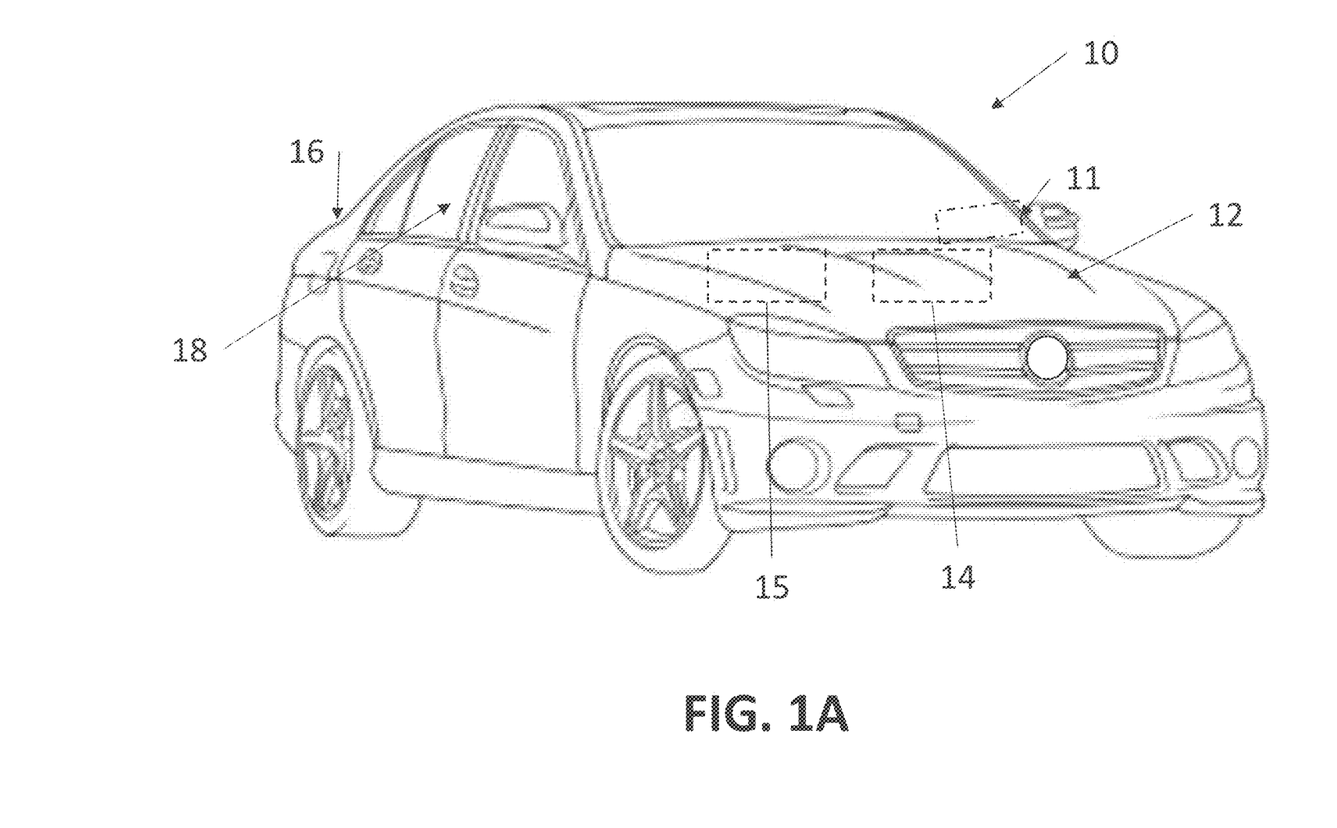
FIGS. 1A, 1B, and 1C, are, respectively, a perspective illustration, a schematic top view illustration, and an interior illustration of a motor vehicle including a safety enhancing system for preventing concurrent driving and use of a mobile phone by drivers, according to embodiments of the teachings herein.
Figure 1B:
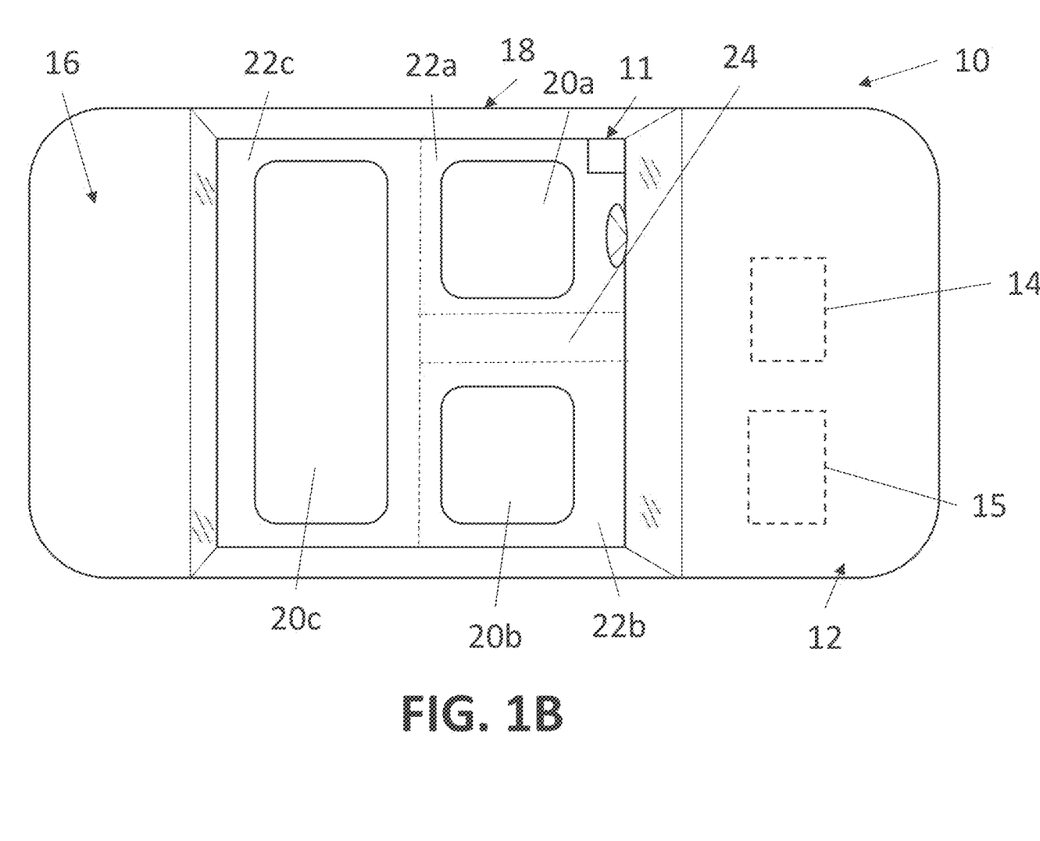
Figure 1C:
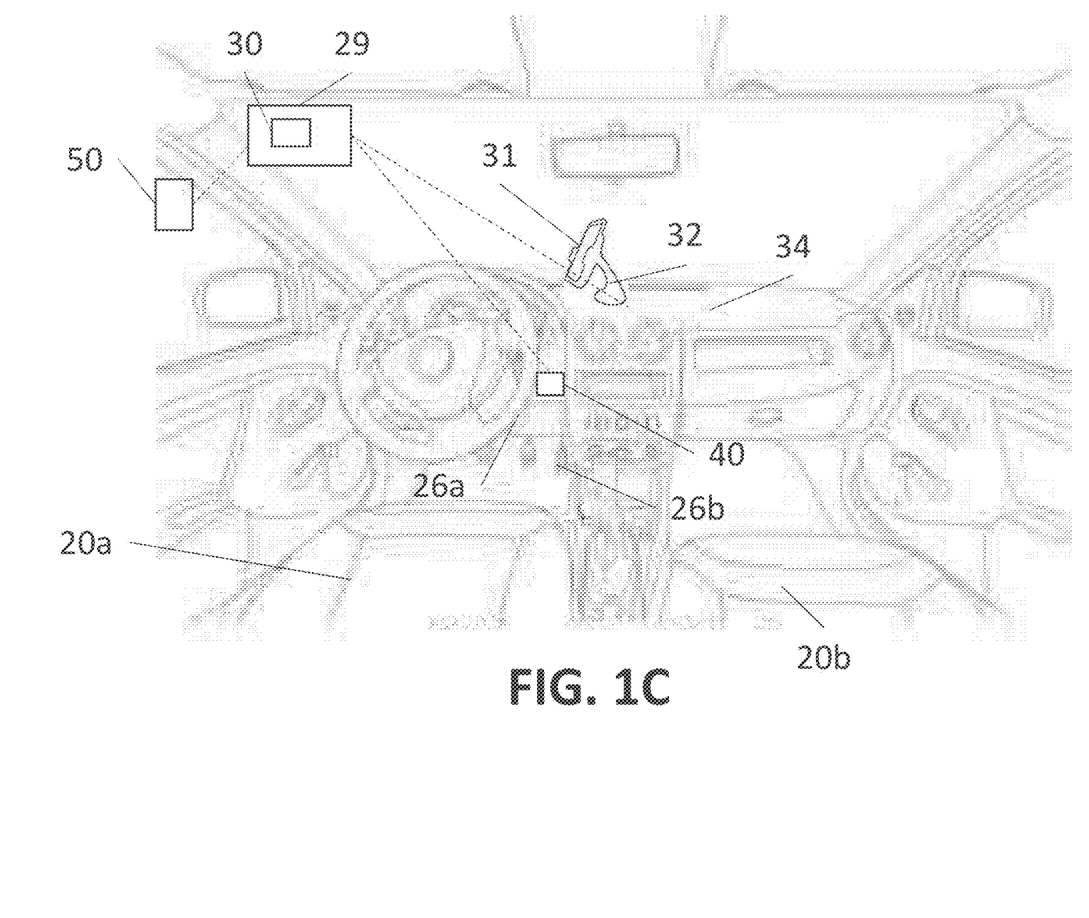

Reference is now made to FIGS. 1A, 1B, and 1C, which are, respectively, a perspective illustration, a top view illustration, and an interior illustration of a motor vehicle 10 including a safety enhancing system 11 for preventing concurrent driving and use of a mobile phone by drivers, according to embodiments of the teachings herein.

As seen in the Figures, the motor vehicle 10, which may be a standard motor vehicle, includes a front portion 12 including a motor 14 and a battery 15, a back portion 16 defining storage space, and a cabin 18 including windows and doors. Cabin 18 includes a driver seat 20a, a driver-adjacent seat 20b, and, in some cases, additional passenger seats 20c. The cabin 18 defines at least two sectors, such that a first sector 22a is a driver-seat sector, and the remaining sectors are passenger seat sectors. In the illustrated embodiment, the passenger sectors include a driver-adjacent sector 22b and a back-seat-sector 22c, although other divisions of the passenger seats into sectors are possible. An intervening region 24 may be defined between the driver-seat sector 22a and the driver-adjacent sector 22b.

Disposed within cabin 18, in driver-seat sector 22a, is a user control 26 adapted to start or accelerate the vehicle, such as an ignition switch or start button 26a and/or an accelerator pedal 26b.

In accordance with the present invention, the system 11 includes detection circuitry 29 including mobile phone detection circuitry 30 is disposed within cabin 18 or in functional association therewith, the mobile phone detection circuitry being configured to detect at least if a mobile phone 31 is present in at least one of the driver seat sector 22a, the driver adjacent sector 22b, and the intervening region 24. As explained in further detail hereinbelow, in some embodiments, the mobile phone detection circuitry may detect the presence of a mobile phone only in the driver-seat sector 22a.

The mobile phone detection circuitry 30 may be any suitable type of circuitry, and may include any one or more of:

a mechanical sensor adapted to mechanically engage with the mobile-phone 31, such as a cradle 32 for holding the mobile phone, disposed, for example on a dashboard 34 within the cabin 18, which detects the presence of the mobile phone within the cradle; at least one image capturing device, such as a camera adapted to capture images of the cabin and to process the images, or provide the images to a processor for processing the images, so as to identify the presence of a mobile phone;

at least one proximity sensor adapted to sense the proximity of a mobile phone thereto;

at least one radio frequency (RF) proximity detector or WiFi transceiver, adapted to detect the presence of a mobile phone by detecting communication signals sent by the mobile phone or connection of the mobile phone to a network; and at least one RFID tag reader, adapted to receive an RFID signal from a mobile phone, such as from an RFID tag mounted onto the mobile phone, so as to detect the presence of the mobile phone.

As explained in further detail hereinbelow with respect to FIGS. 2 and 4, detection circuitry 29 may include additional detection components.

The system 11 further includes a disabling circuitry 40, functionally associated with detection circuitry 29, including at least one of motor-vehicle disabling circuitry and mobile phone disabling circuitry, described in further detail hereinbelow. The disabling circuitry 40 is adapted to receive input from detection circuitry 29, and, when suitable (in accordance with the methods described hereinbelow with respect to FIGS. 3 and 5) to activate operation of the motor-vehicle disabling circuitry and/or of the mobile phone disabling circuitry.

In some embodiments, the system 11 further includes at least one triggering sensor 50, adapted to sense a triggering event in the motor vehicle 10, and to trigger operation of the detection circuitry 29 in response to the triggering event.

For example, the sensor 50 may be a motion sensor mounted onto a door of the motor vehicle 10. In such embodiments, the sensor 50 is adapted to sense opening and closing of the door, and to trigger operation of the detection circuitry 29 upon detection of opening of the door of the vehicle, at which point a mobile phone may be inserted into or removed from the motor vehicle. As another example, the sensor 50 may be adapted, in an automatic transmission vehicle, to sense moving the control of the vehicle from PARK to DRIVE or REVERSE. As a further example, the sensor 50 may be adapted, in a manual transmission vehicle, to sense the transmission moving out of NEUTRAL gear and into a driving gear. As yet another example, the sensor 50 may be a weight sensor adapted to sense the weight of a driver sitting in the driver's seat 20a. In some embodiments, such as the embodiment of FIGS. 2 and 3, the sensor 50 may sense activation of the motor 14 of the motor vehicle, or turning the switch of an ignition or pressing a start button thereof.

In some embodiments, the detection circuitry 29, the disabling circuitry 40, and/or the triggering sensor 50 are electrically connected to the battery 15 of the motor vehicle 10, and are powered thereby. In other embodiments, the detection circuitry 29, the disabling circuitry 40, and/or the triggering sensor 50 may have a dedicated power source, such as a dedicated battery. The systems described hereinbelow with respect to FIGS. 2 and 4 use the components illustrated in FIGS. 1A to 1C, as well as additional components. Any components illustrated in FIGS. 1A to 1C carry the same reference numerals in FIGS. 2 and 4.

Figure 2:
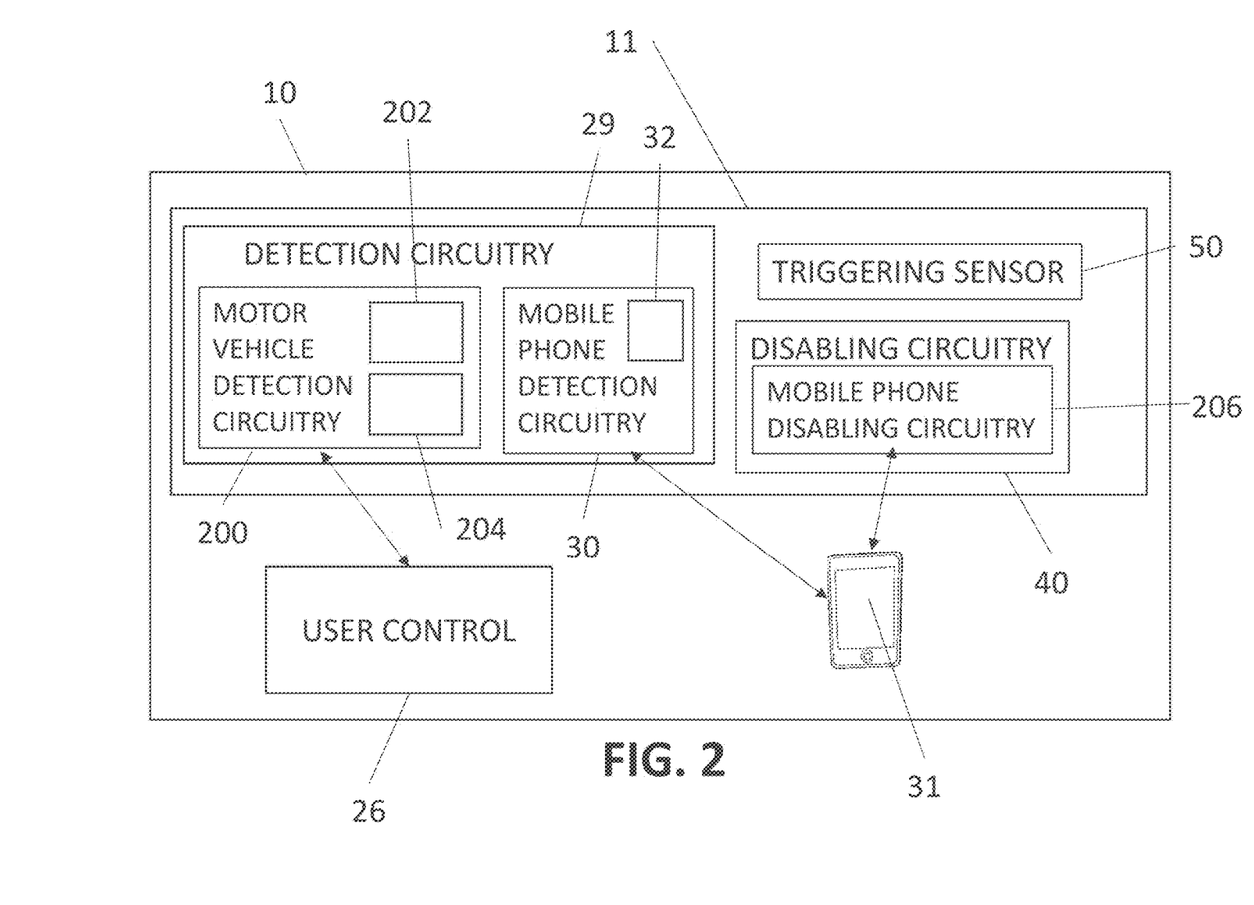
FIG. 2 is a schematic block-diagram of components of the safety enhancing system of FIGS. 1A to 1C, according to a first embodiment of the teachings herein.

Reference is now made to FIG. 2, which is a schematic block-diagram of components of the safety enhancing system of FIGS. 1A to 1C, according to a first embodiment of the teachings herein.

As seen in FIG. 2, the motor-vehicle 10 includes the user control 26, motor 14, and the safety enhancing system 11.

In the embodiment of FIG. 2, the detection circuitry 29 includes mobile phone detection circuitry 30 adapted to detect the presence of mobile phone 31 within the vehicle, and more specifically within the driver seat sector 22a of the vehicle. Detection circuitry 29 further includes a motor vehicle detection circuitry 200 including a motion detection module 202 for detecting whether the vehicle is in motion. In some embodiments, motor vehicle detection circuitry may include a motor detection module 204 for detecting whether the motor of the motor vehicle is running in addition to, or instead of, the motion detection module 202. The motor vehicle detection circuitry 200 is be functionally associated with user control 26 and/or with motor 14.

The motion detection module 202 may include, or be associated with, any suitable motion detection circuitry. In some embodiments, the motion detection module includes, or is associated with, a receiver for receiving signals from a global navigation satellite system such as a Global Positioning System (GPS), GLONASS, or Galileo. In some embodiments, the motion detection module includes, or is associated with, an accelerometer or an odometer, which may form part of vehicle 10 and/or may be associated with motor 14.

The motor detection module 204 may include, or be associated with, any suitable circuitry, such as circuitry for sensing whether a key turned in the ignition switch of the vehicle 10, circuitry for sensing whether a start button of the vehicle 10 has been pressed, or circuitry for sensing motion of the pistons of the motor 14.

Detection circuitry 29 is functionally associated with disabling circuitry 40, which includes mobile phone disabling circuitry 206, which is adapted to disable at least some functionality of the mobile phone 31.

The mobile phone disabling circuitry 206 may be any suitable circuitry for sending a signal to the mobile phone to disable at least some functionality thereof. In some embodiments, the mobile phone disabling circuitry 206 may include an RF transceiver or a WiFi transceiver adapted to provide an RF signal to the mobile phone for disabling functionalities thereof. In some embodiments, the mobile phone disabling circuitry may include a device associated with GSM or another mobile phone network adapted to provide a phone signal, such as an SMS message, to the mobile phone for disabling functionalities thereof.

In some embodiments, the mobile phone detection circuitry 30 includes mobile phone cradle 32, as described hereinabove, which cradle forms part of the mobile phone disabling circuitry 206, such that, when mobile phone 31 is disposed within the cradle 32, the mobile phone disabling circuitry 206 disables fewer functionalities of the mobile phone 31 than if the mobile phone is not in the cradle 32.

Figure 3:
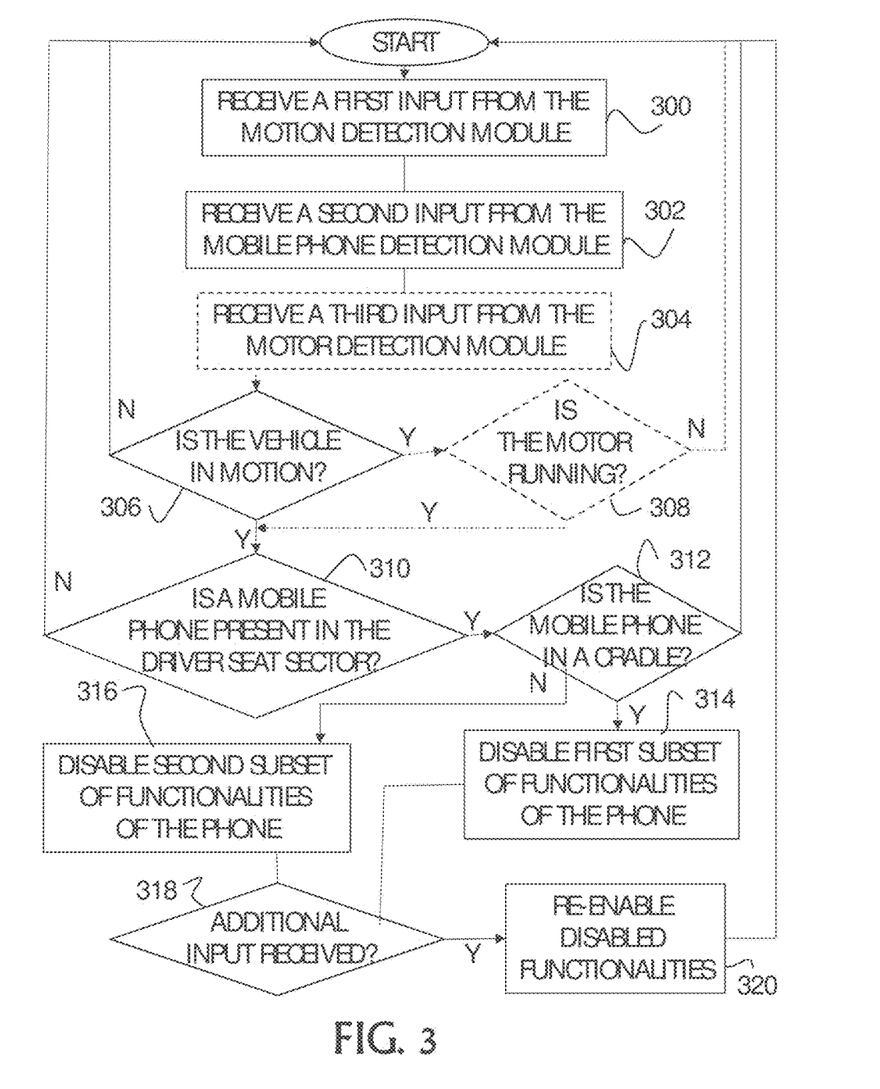
FIG. 3 is a flow chart of a method for preventing concurrent driving and use of a mobile phone by drivers using the system of FIG. 2.

Turning now additionally to FIG. 3, the figure illustrates a flow chart of a method for preventing concurrent driving and use of a mobile phone by drivers using the system of FIG. 2.

As seen in FIG. 3, at step 300 the phone disabling circuitry 206 receives a first input from the motion detection module 202 of the motor vehicle detection circuitry 200, indicating whether or not the vehicle is in motion.

At step 302, the phone disabling circuitry 206 receives a second input from the mobile phone detection circuitry 30, indicating whether or not a mobile phone, such as mobile phone 31, is present in the driver-seat sector of the motor vehicle. In some embodiments, the second input additionally indicates whether or not the mobile phone is disposed within the mobile phone cradle 32.

In some embodiments, at step 304 the phone disabling circuitry 206 may additionally receive a third input from the motor detection module 204 of the motor vehicle detection circuitry 200, indicating whether or not the vehicle is running.

It is appreciated that steps 300, 302, and 304, may be carried out in any suitable order, and need not necessarily be carried out in the order presented in FIG. 3.

The mobile phone detection circuitry 30 may detect whether or not a phone is present, and may provide input to the phone disabling circuitry 206, at any suitable time.

In some embodiments, the mobile phone detection circuitry 30 provides the inputs periodically at a first input rate. The first input rate may be any suitable rate, such as, once every 10 milliseconds, once every second, once every 10 seconds, once every 30 seconds, once every minute, once every two minutes, or once every five minutes. In some embodiments, the motor vehicle detection circuitry 200 provides the inputs periodically at a second input rate. The second input rate may be any suitable rate, such as, once every 10 milliseconds, once every second, once every 10 seconds, once every 30 seconds, once every minute, once every two minutes, or once every five minutes. In some embodiments, the second input rate corresponds to the first input rate.

In other embodiments, the mobile phone detection circuitry 30 and/or the motor vehicle detection circuitry 200 provide the input intermittently. In some such embodiments, mobile phone detection circuitry 30 and/or the motor vehicle detection circuitry 200 provide the input in response to a triggering signal provided by a triggering sensor 50 in response to the sensor 50 sensing a triggering event. Following receipt of the triggering signal, mobile phone detection circuitry 30 and/or the motor vehicle detection circuitry 200 may provide a single input to phone disabling circuitry 206, or may provide input at a suitable input rate, such as once every 10 milliseconds, once every second, once every 10 seconds, once every 30 seconds, or once every minute. In some embodiments, the mobile phone detection circuitry 30 and/or the motor vehicle detection circuitry 200 provide may continue to provide the input at the input rate for a pre-determined time duration, such as 10 minutes. In some embodiments, the mobile phone detection circuitry 30 and/or the motor vehicle detection circuitry 200 may each provide a pre-determined number of inputs at the input rate, such as providing 20 input signals. In some embodiments, mobile phone detection circuitry 30 and/or the motor vehicle detection circuitry 200 may continue to provide the input at the input rate until receiving a second signal from triggering sensor 50.

At step 306 the phone disabling circuitry 206, or a processor associated therewith, evaluates whether the first input indicates that the motor vehicle 10 is in motion. In some embodiments, if the first input indicates that the motor vehicle is not in motion, the phone disabling circuitry 206 waits to receive additional input and returns to the start of the method. In other embodiments, in which a third input was received from the motor detection module 204, if the first input indicates that the motor vehicle is not in motion, the phone disabling circuitry 206 may optionally evaluate whether or not the third input indicates that the vehicle is running, at step 308.

If at step 308 the phone disabling circuitry 206 determines that the third input indicates that the vehicle is not running, the phone disabling circuitry 206 waits to receive additional input and returns to the start of the method.

Otherwise, if at step 306 the phone disabling circuitry 206 determines that the first input indicates that the motor vehicle 10 is in motion, or if step 308 is carried out and the third input indicates that the motor vehicle 10 is running, at step 310 the phone disabling circuitry evaluates whether the second input indicates that a mobile phone 31 is present in the driver-seat sector 22a of the vehicle 10.

If at step 310 the phone disabling circuitry 206 determines that the second input indicates that there is no mobile phone present in the driver-seat sector 22a, the phone disabling circuitry 206 waits to receive additional input and returns to the start of the method. Otherwise, if it is determined that a mobile phone is present in the driver seat sector, at step 312 phone disabling circuitry 206 evaluates whether the mobile phone is located in phone cradle 32, using the input signal received from the mobile phone detection circuitry or from another sensor.

If at step 312 it is determined that the mobile phone in the driver-seat sector is located in the phone-cradle 32, at step 314 the phone disabling circuitry 206 affects disabling of a first subset of functionalities of the mobile phone 31. In some embodiments, the first subset of functionalities does not include navigation functionalities and voice controlled or hands free functionalities, such as voice controlled dialing, voice controlled communication, and dictating of text.

Otherwise, if at step 312 it is determined that the mobile phone is not located within the phone cradle, at step 316 the phone disabling circuitry 206 affects disabling of a second subset of functionalities of mobile phone 31. In some embodiments, the second subset of functionalities includes all functionalities of the mobile phone. In other embodiments, the second subset of functionalities includes any functionality requiring a user of the mobile phone to type, touch a touch-screen of the mobile phone, use a camera, or watch a video or any other display on the screen, with the possible exception of navigational information displayed on the screen.

Disabling of functionalities of the mobile phone by the phone disabling circuitry may be affected in any suitable way, such as sending a disabling signal from the phone disabling circuitry 206 to the mobile phone 31.

Following disabling of at least one functionality of the mobile phone 31, at step 318 the phone disabling circuitry 206 awaits additional input, indicating a change in the conditions of the vehicle and/or of the mobile phone, which would indicate that the functionalities of the mobile phone may be re-enabled. If at step 318 it is established that such additional input was received, at step 320 the phone disabling circuitry re-enables the previously disabled functionalities, for example by sending an enabling signal to the mobile phone 31, and then proceeds to the start of the method to await new inputs from the detection circuitry 29.

Figure 4:
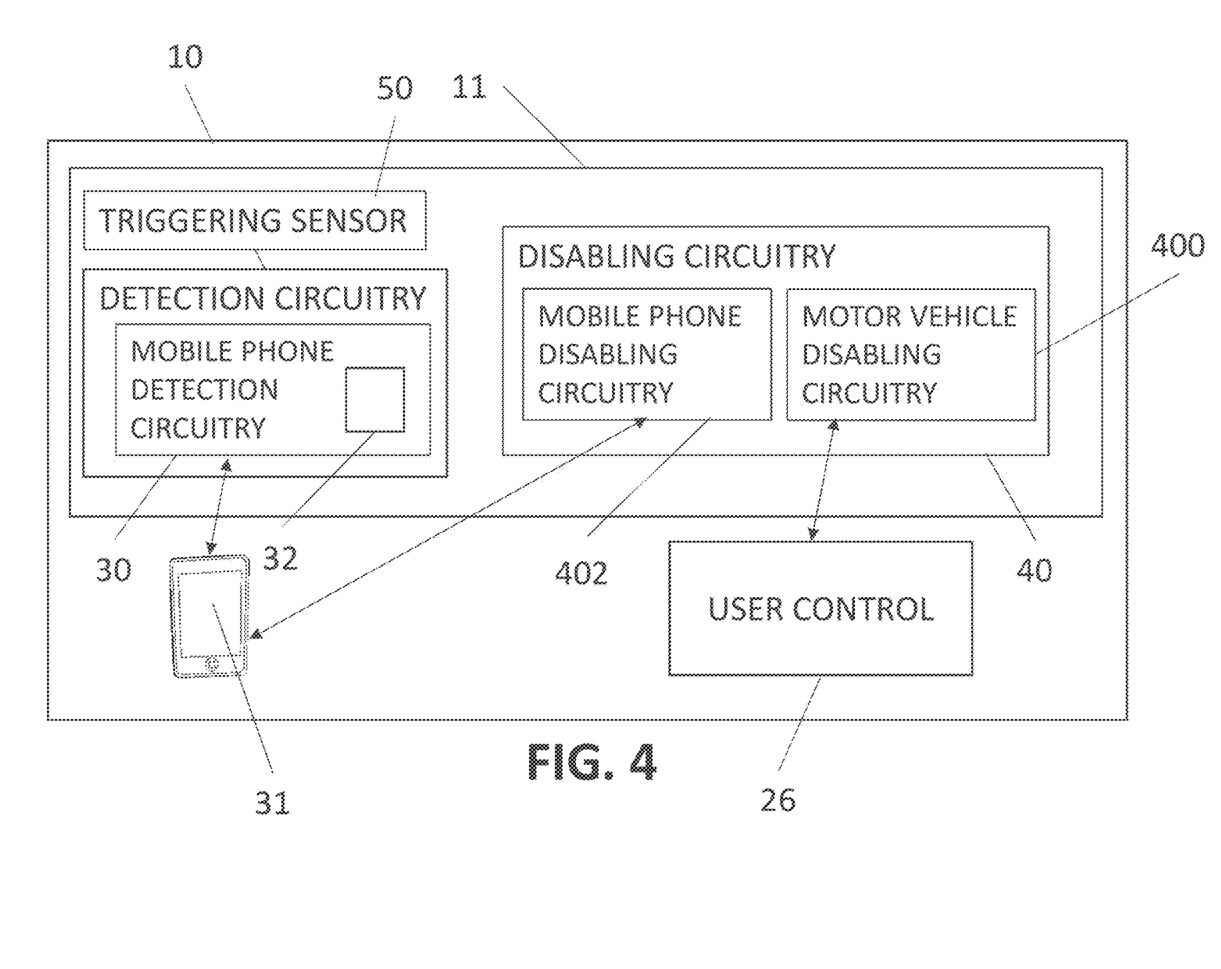
FIG. 4 is a schematic block-diagram of components of the safety enhancing system of FIGS. 1A to 1C, according to a second embodiment of the teachings herein.

Reference is now made to FIG. 4, which is a schematic block-diagram of components of the safety enhancing system of FIGS. 1A to 1C, according to a second embodiment of the teachings herein.

As seen in FIG. 4, the motor-vehicle 10 includes the user control 26, motor 14, and the safety enhancing system 11.

In the embodiment of FIG. 4, the detection circuitry 29 includes mobile phone detection circuitry 30 adapted to detect the presence of mobile phone 31 within the vehicle, and more specifically within the driver seat sector 22a, the driver-adjacent sector 22b, or the intervening region 24 of the vehicle. In some embodiments, the mobile phone detection circuitry 30 includes mobile phone cradle 32, as described hereinabove, adapted to detect whether a mobile phone is within the cradle, or whether the cradle is empty.

Detection circuitry 29 is functionally associated with disabling circuitry 40, which includes motor vehicle disabling circuitry 400, which is functionally associated with the user control 26 and is adapted to disable or degrade the ability of the user control 26 to trigger starting of the motor vehicle 10 or affecting acceleration of the motor vehicle.

In some embodiments, the disabling circuitry 40 further includes mobile phone disabling circuitry 402, functionally associated with the cradle 32 and adapted to disable at least some functionalities of a mobile phone 31 disposed within the cradle 32. The mobile phone disabling circuitry 402 may be any suitable circuitry for sending a signal to the mobile phone to disable at least some functionality thereof. In some embodiments, the mobile phone disabling circuitry 206 may include an RF transceiver or a WiFi transceiver adapted to provide an RF signal to the mobile phone for disabling functionalities thereof. In some embodiments, the mobile phone disabling circuitry may include a device associated with GSM or another mobile phone network adapted to provide a phone signal, such as an SMS message, to the mobile phone for disabling functionalities thereof.

Figure 5:
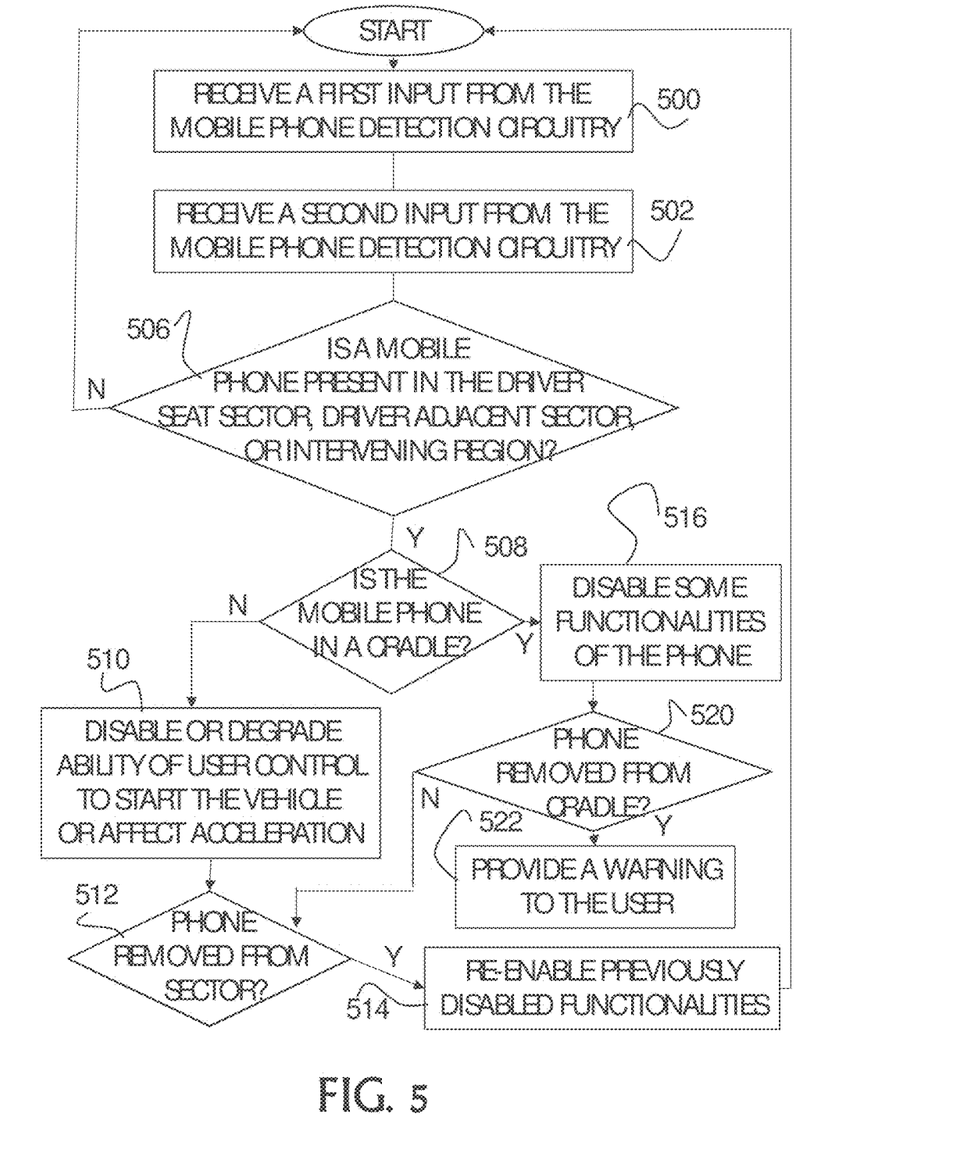
FIG. 5 is a flow chart of a method for preventing concurrent driving and use of a mobile phone by drivers using the system of FIG. 4.

Turning now additionally to FIG. 5, the figure illustrates a flow chart of a method for preventing concurrent driving and use of a mobile phone by drivers using the system of FIG. 4.

As seen in FIG. 5, at step 500 the disabling circuitry 29, and specifically the motor vehicle disabling circuitry, receives a first input from the mobile phone detection circuitry 30, indicating whether or not a mobile phone, such as mobile phone 31, is present in the driver-seat sector 22a, the driver-adjacent sector 22b, or the intervening region 24 of the motor vehicle 10. In some embodiments, the first input indicates only if the mobile phone is present in driver seat sector 22a

In some embodiments, at step 502 the disabling circuitry 29 receives a second input from the mobile phone detection circuitry 30, indicating whether or not a mobile phone is disposed within the mobile phone cradle 32.

The mobile phone detection circuitry 30 may detect whether or not a phone is present and/or disposed within the cradle, and may provide input to the disabling circuitry 40, at any suitable time.

In some embodiments, the mobile phone detection circuitry 30 provides the inputs periodically at a first input rate. The first input rate may be any suitable rate, such as, once every 10 milliseconds, once every second, once every 10 seconds, once every 30 seconds, once every minute, once every two minutes, or once every five minutes.

In other embodiments, the mobile phone detection circuitry 30 provides the input intermittently. In some such embodiments, mobile phone detection circuitry 30 provides the input in response to a triggering signal provided by a triggering sensor 50 in response to the sensor 50 sensing a triggering event. Following receipt of the triggering signal, mobile phone detection circuitry 30 may provide a single input to disabling circuitry 40, or may provide input at a suitable input rate, such as once every 10 milliseconds, once every second, once every 10 seconds, once every 30 seconds, or once every minute. In some embodiments, the mobile phone detection circuitry 30 may continue to provide the input at the input rate for a pre-determined time duration, such as 10 minutes. In some embodiments, the mobile phone detection circuitry 30 may provide a pre-determined number of inputs at the input rate, such as providing 20 input signals. In some embodiments, mobile phone detection circuitry 30 may continue to provide the input at the input rate until receiving a second signal from triggering sensor 50.

At step 506 the disabling circuitry 29, and specifically the motor vehicle disabling circuitry 400 or a processor associated therewith, evaluates whether the first input indicates that a mobile phone is present in the driver-seat sector 22a, the driver-adjacent sector 22b, or the intervening region 24 of the motor vehicle 10. In some embodiments, the disabling circuitry evaluates whether the mobile phone is present in the driver seat sector 22a.

If at step 506 it is established that no mobile phone is present in the evaluated sector(s), the disabling circuitry 29 waits to receive additional input and returns to the start of the method.

Otherwise, if at step 506 it is established that a mobile phone is present in the evaluated sector(s), at step 508 the disabling circuitry 29 evaluates whether the second input indicates that the mobile phone is disposed with cradle 32.

If at step 508 it is determined that the mobile phone in the evaluated sector(s) is not disposed within a phone cradle, or if a second input was not received at step 502, for example because the motor vehicle 10 does not include a phone cradle, at step 510 the motor vehicle disabling circuitry 400 disables or degrades the ability of the user control 26 to start the motor vehicle or to affect acceleration of the motor vehicle. For example, the motor vehicle disabling circuitry may block access of the key to the ignition, block pressing of a start button of the vehicle, or may electrically disconnected the car battery 15 from the motor 14 so as to prevent powering of the motor.

Following disabling or degrading functionality of the motor vehicle at step 510, at step 512 the disabling circuitry 40 awaits additional input, indicating a change in the conditions of the vehicle and/or of the mobile phone, which would indicate that the user control 26, such as input indicating that the mobile phone is in the cradle 32, or that the mobile phone is no longer present in the evaluated sector(s). If at step 512 it is established that such additional input was received, at step 514 the motor vehicle disabling circuitry 400 re-enables the disabled functionality (i.e. the ability of the user control 26 to start the motor vehicle 10 or to affect acceleration thereof), and then proceeds to the start of the method to await new inputs from the detection circuitry 29.

If at step 508 it is determined that the mobile phone in the evaluated sector(s) is located in the phone-cradle 32, at step 516 the phone disabling circuitry 402 affects disabling of a first subset of functionalities of the mobile phone 31, including at least one of texting, web-surfing, reading documents, watching videos, reading and writing emails, conducting video calls, using a camera, and any other functionality requiring the user to type, touch a touchscreen of the mobile phone, or watch the screen of the mobile phone. In some embodiments, the first subset of functionalities does not include navigation functionalities and voice controlled or hands free functionalities, such as voice controlled dialing, voice controlled communication, and dictating of text.

Disabling functionalities of the mobile phone by the phone disabling circuitry 402 may be affected in any suitable way, such as sending a disabling signal from the phone disabling circuitry 402 to the mobile phone 31.

Following disabling of at least one functionality of the mobile phone 31, the phone disabling 29 awaits additional input, indicating a change in the conditions of the mobile phone.

If at step 520 it is determined that the additional input indicates that the mobile phone has been removed from the cradle, at step 522 a warning providing module functionally associated with the phone disabling circuitry 402, with mobile phone detection circuitry 30, or with cradle 32, may provide a warning to the user of the vehicle or to a remote entity, such as a supervisor of the user, a parent of the user, or security or law enforcement personnel, notifying them that the mobile phone is out of the cradle and/or that the driving conditions are unsafe.

Otherwise, if at step 520 it is determined that the phone has not been removed from the cradle, the method continues to await additional input indicating that the mobile phone has been removed from the evaluated sector(s) at step 512.

In some embodiments, the system 11 further includes a phone recognition mechanism, adapted to recognize one or more specific mobile phones, and the motor vehicle disabling circuitry only disables the user control if the mobile phone detected in the evaluated sector(s) belongs to an owner of the vehicle, or to a frequent driver of the vehicle.

It is appreciated that though the description above is provided with respect to a vehicle having a driver sector, a driver adjacent sector, and additional passenger sectors, the systems and methods of the present invention may be equally applicable to a vehicle having only a driver sector, such as a motorcycle, a farming vehicle, or a miniature car, or to a vehicle having only two seats including a driver seat and a driver adjacent seat, be the driver adjacent seat alongside the driver seat or behind the driver seat.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A system comprising:
    a. a motor vehicle having at least a driver-seat within a driver seat sector;
    b. a user control disposed in the driver-seat sector such that engagement of the user control starts or accelerates the motor vehicle;
    c. first detection circuitry for detecting at least one of whether said motor vehicle is in motion and whether a motor of said motor vehicle is running;
    d. second detection circuitry for detecting at least if a mobile phone is present in said driver-seat sector; and
    e. phone disabling circuitry for disabling at least some functionality of said mobile phone, said phone disabling circuitry receiving a first input from said first detection circuitry and a second input from said second detection circuitry,
    wherein, if said first input indicates that said motor-vehicle is in motion, and said second input indicates a presence of a mobile phone in said driver-seat sector, said phone-disabling circuitry disables said at least some functionality of said mobile phone,
    wherein said at least some functionality includes any functionality requiring a user of said mobile phone to type, take photos, or watch a video, and does not include any voice activated functionality, hands-free functionality, or navigation functionalities.

2. The system of claim 1, wherein said first detection circuitry is further for detecting if a motor of said motor vehicle is running, and wherein said phone disabling circuitry disables said at least some functionality of said mobile phone if said first input indicates that said motor of said vehicle is running and said second input indicates a presence of said mobile phone in said driver seat sector.

3. The system of claim 1, wherein said phone disabling circuitry is adapted to disable all functionality of said mobile phone if said first input indicates that said motor-vehicle is in motion, and said second input indicates a presence of a mobile phone in said driver-seat sector.

4. The system of claim 1, wherein said phone disabling circuitry is adapted to disable said at least some functionality of said mobile phone if said first input indicates that said motor of said motor-vehicle is running, and said second input indicates a presence of a mobile phone in said driver-seat sector, even if said motor-vehicle is not in motion.

5. The system of claim 1, wherein said second detection circuitry includes a mechanical sensor adapted to mechanically engage with said mobile-phone, and wherein said phone disabling circuitry is adapted to disable fewer functionalities of said mobile phone if said second input indicates a mechanical engagement of said mobile-phone to said mechanical sensor than if said second input indicates that there is no mechanical engagement between said mobile phone and said mechanical sensor.

6. The system of claim 5, wherein said mechanical sensor comprises a cradle adapted to receive said mobile phone therein.

7. The system of claim 1, wherein said vehicle further includes at least one passenger seat defined in at least one passenger sector.

8. A method for preventing use of a mobile phone during driving, to be carried out in a motor vehicle having at least a driver-seat within a driver-seat sector, the method comprising:
   a. receiving a first input indicating whether the motor-vehicle is in motion;
   b. receiving a second input indicating whether a mobile phone is present in the driver-seat sector of the motor vehicle; and
   c. if said first input indicates that said motor-vehicle is in motion, and said second input indicates a presence of a mobile phone in the driver-seat sector, disabling at least some functionality of said mobile phone present in the driver-seat sector,
      wherein said disabling at least some functionality includes disabling any functionality requiring a user of said mobile phone to type, take photos, or watch a video, and does not include disabling any voice activated functionality, hands-free functionality, or navigation functionalities.

9. The method of claim 8, further comprising:
   d. receiving a third input indicating whether a motor of the motor-vehicle is running; and
   e. if said third input indicates that said motor is running, and said second input indicates a presence of a mobile phone in the driver-seat sector, disabling at least some functionality of said mobile phone present in the driver-seat sector.

10. The method of claim 9, wherein (e) takes place even if said first input indicates that the motor vehicle is not in motion.

11. The method of claim 8, wherein said receiving a second input indicating whether a mobile phone is present in the driver-seat sector of the motor vehicle includes receiving said second input indicating whether said mobile phone is mechanically engaged with a mechanical sensor, and wherein said disabling at least some functionality comprises disabling fewer functionalities of said mobile phone if said second input indicates a mechanical engagement of said mobile-phone to said mechanical sensor than if said second input indicates that there is no mechanical engagement between said mobile phone and said mechanical sensor.

12. A system comprising:
   a. a motor vehicle having at least a driver seat within a driver seat sector;
   b. a user control disposed in the driver-seat sector such that engagement of the user control starts or accelerates the motor vehicle;
   c. first detection circuitry for detecting at least if a mobile phone is present in said driver-seat sector;
   d. motor-vehicle disabling circuitry for disabling or degrading the ability of the user control to trigger starting of the motor vehicle or affecting acceleration thereof, said motor-vehicle disabling circuitry receiving a first input from said first detection circuitry;
   e. a phone-cradle mounted in said driver-seat sector; and
   f. second detection circuitry functionally associated with said phone-cradle for detecting if said phone-cradle is occupied by said mobile phone,
      wherein, if said first input indicates a presence of a mobile phone in said driver-seat sector, and said motor-vehicle disabling circuitry receives a second input from said second detection circuitry said motor-vehicle disabling circuitry disables or degrades the ability of said user control to trigger starting of the motor vehicle or affecting acceleration thereof.

13. The system of claim 12, wherein prior to disabling or degrading the ability of said user control to trigger starting of said motor vehicle or affecting acceleration thereof, said motor-vehicle disabling circuitry notifies a user of said vehicle that, in a pre-determined time period, the motor vehicle will be disabled.

14. The system of claim 12, wherein said motor-vehicle disabling circuitry enables the ability of the user control to start the motor vehicle or affect acceleration thereof if said second user input indicates that said mobile-phone is placed in said cradle.

15. The system of claim 12, further comprising application disabling circuitry functionally associated with at least one of said first and second detection circuitry, for disabling at least some functionalities of said mobile-phone if said second detection circuitry indicates that said mobile-phone is disposed in said cradle.

16. The system of claim 12, further comprising a warning providing module, adapted to provide a warning to at least one of the user and a remote entity if said mobile-phone is removed from said cradle while said motor-vehicle is started or moving.

17. The system of claim 12, wherein said first detection circuitry includes a phone-recognition module adapted to identify a specific phone, and wherein said motor-vehicle disabling circuitry disables or degrades the ability of said user control to trigger starting of the motor vehicle or affecting acceleration thereof only if said first input indicates a presence of said specific mobile phone in said driver-seat sector.

* * * * *